US011323240B2

(12) United States Patent
Vaikuntanathan

(10) Patent No.: US 11,323,240 B2
(45) Date of Patent: May 3, 2022

(54) INTERACTIVE TECHNIQUES FOR ACCELERATING HOMOMORPHIC LINEAR OPERATIONS ON ENCRYPTED DATA

(71) Applicant: Duality Technologies, Inc., Maplewood, NJ (US)

(72) Inventor: Vinod Vaikuntanathan, Boston, MA (US)

(73) Assignee: DUALITY TECHNOLOGIES INC., Maplewood, NJ (US)

( * ) Notice: Subject to any disclaimer, the term of this patent is extended or adjusted under 35 U.S.C. 154(b) by 678 days.

(21) Appl. No.: 16/287,512

(22) Filed: Feb. 27, 2019

(65) Prior Publication Data

US 2022/0052834 A1 Feb. 17, 2022

Related U.S. Application Data

(60) Provisional application No. 62/637,000, filed on Mar. 1, 2018.

(51) Int. Cl.
*H04L 9/32* (2006.01)
*H04L 9/00* (2022.01)
*H04L 9/14* (2006.01)

(52) U.S. Cl.
CPC ................ *H04L 9/008* (2013.01); *H04L 9/14* (2013.01); *H04L 2209/08* (2013.01); *H04L 2209/46* (2013.01)

(58) Field of Classification Search
USPC .......................................................... 713/168
See application file for complete search history.

(56) References Cited

U.S. PATENT DOCUMENTS

2015/0046985 A1* 2/2015 D'Souza ................. H04L 63/08 726/4
2015/0089243 A1* 3/2015 Veugen ................... H04L 9/008 713/190
2017/0372201 A1* 12/2017 Gupta .................... G06N 3/084

OTHER PUBLICATIONS

Ben-Or et al., "Completeness Theorems for Non-Cryptographic Fault-Tolerant Distributed Computation", ACM Symposium on the Theory of Computing (STOC) 1988, pp. 1-10.

(Continued)

*Primary Examiner* — Jeffrey C Pwu
*Assistant Examiner* — Samuel Ambaye
(74) *Attorney, Agent, or Firm* — Pearl Cohen Zedek Latzer Baratz LLP

(57) ABSTRACT

An interactive multi-party system for collaboratively performing homomorphic operations, such that no party has access to unencrypted data or an unencrypted operator. A first party device may add noise to encrypted data and an encrypted linear operator to generate noisy encrypted data and a noisy encrypted operator, and transmit the noisy encrypted data and operator to a second party device possessing a secret decryption key for the encryption. The second party device may decrypt the noisy encrypted data and noisy encrypted operator to generate unencrypted noisy data and an unencrypted noisy operator, solve the linear operation using the unencrypted noisy data and an unencrypted noisy operator to generate a noisy solution, encrypt the noisy solution to the linear operation, and transmit it to the first party device. The first party device may then cancel the noise of the encrypted noisy solution to generate the encrypted solution to the linear operation.

16 Claims, 3 Drawing Sheets

DEVICE 101 (Encrypted Domain)
Network 120
DEVICE 102 (Unencrypted Domain)
100
103 [A] and [b]
105 Noise
107 [Z] and [y]
109 [Z] and [y]
111 Decrypt
113 Z and y
115 Linear Operation
117 $c'=Z^{-1}y=R^{-1}A^{-1}(b+At)$
119 Encrypt
121 [c']
[c']
123 Cancel Noise
125 [c]

(56) References Cited

OTHER PUBLICATIONS

Bost et al., “Machine Learning Classification over Encrypted Data”, Network and Distributed System Security Symposium (NDSS) 2015.
Brakerski et al., “Efficient Fully Homomorphic Encryption from (Standard) LWE”, IEEE Foundations of Computer Science (FOCS) 2011, pp. 97-106.
Brakerski et al., “Fully Homomorphic Encryption without Bootstrapping”, ACM Innovation in Theoretical Computer Science (ITCS) 2012, pp. 309-325.
Chaum et al., “Multiparty Unconditionally Secure Protocols”, ACM Symposium on the Theory of Computing (STOC) 1988, pp. 11-19.
Gascon et al., “Secure Linear Regression on Vertically Partitioned Datasets”, IACR Cryptology Eprint Archive 2016/892.
Gentry, Craig, “Fully Homomorphic Encryption from Ideal Lattices”, ACM Symposium on the Theory of Computing (STOC) 2009, pp. 169-178.
Goldreich et al., “How to Play any Mental Game or a Completeness Theorem for Protocols with Honest Majority”, ACM Symposium on the Theory of Computing (STOC) 1987, pp. 218-229.
Rivest et al., “On Data Banks and Privacy Homomorphisms”, Foundations of Secure Computation 1978, pp. 169-177.
Wu et al., “Using Homomorphic Encryption for Large Scale Statistical Analysis”, Stanford Technical Report 2012, https://crypto.stanford.edu/~dwu4/papers/FHE-SI_Report.pdf.
Yao, Andrew, “How to Generate and Exchange Secrets”, IEEE Foundations of Computer Science (FOCS) 1986, pp. 162-167.

* cited by examiner 200
104
118
116
Network
120
102
158
156
101
148
146

INTERACTIVE TECHNIQUES FOR ACCELERATING HOMOMORPHIC LINEAR OPERATIONS ON ENCRYPTED DATA

CROSS-REFERENCE TO RELATED APPLICATIONS

This application claims the benefit of U.S. Provisional Patent Application No. 62/637,000 filed on Mar. 1, 2018, which is hereby incorporated by reference in its entirety.

FIELD OF THE INVENTION

Embodiments of the invention relate to the field of data encryption, decryption and re-encryption, and in particular, to operating on encrypted data, e.g., by homomorphic operations, without exposing the underlying decrypted data.

BACKGROUND OF THE INVENTION

Fully Homomorphic Encryption (FHE) cryptosystems allow untrusted or third party users to perform computations on encrypted data without exposing the underlying data, such that, only the legitimate recipient of the homomorphic calculation is able to decrypt the data using the recipient's secret key. FHE cryptosystems are useful, for example, to perform operations on joint data from two separate parties encrypted by two different respective encryption keys. Each individual party cannot operate on the joint data because it does not have access to the other party's secret decryption key, but either party could perform homomorphic operations on the joint data.

Although FHE can theoretically work on any data, practically, FHE is very slow and computationally intensive because complex operations must be broken up into individual additive and multiplicative steps that are preserved under the homomorphism. Moreover, when the number of multiplications is at least moderately large or arithmetic is performed on large integers or fixed-point numbers, FHE incurs tremendous slowdown compared to computations with plaintext numbers. In practice, FHE is unrealistic to use in most real-world scenarios, especially when large amounts of data and complex computations are involved.

Accordingly, there is a need in the art to provide a faster and more efficient mechanism to compute homomorphic operations on encrypted data.

SUMMARY OF EMBODIMENTS OF THE INVENTION

According to an embodiment of the invention, a device, system and method is provided to resolve the aforementioned problems inherent in the art by providing a fast and secure Fully Homomorphic Encryption (FHE) cryptosystem.

According to an embodiment of the invention, a device, system and method is provided for collaboratively performing homomorphic operations in an interactive multi-party system, such that no party's device has access to unencrypted data or an unencrypted operator. At a first party device, encrypted data and an encrypted operator may be obtained for operating on the encrypted data according to a linear operation, noise may be added to the encrypted data and operator to generate noisy encrypted data and a noisy encrypted operator, and the noisy encrypted data and noisy encrypted operator may be transmitted to a second party device possessing a secret decryption key for the encryption. At the second party device, the noisy encrypted data and noisy encrypted operator may be decrypted to generate unencrypted noisy data and an unencrypted noisy operator, the linear operation may be solved using the unencrypted noisy data and an unencrypted noisy operator to generate a noisy solution, the noisy solution to the linear operation may be encrypted, and the encrypted noisy solution to the linear operation may be transmitted to the first party device. At the first party device, the encrypted noisy solution to the linear operation may be received, and the noise of the encrypted noisy solution may be cancelled to generate the encrypted solution to the linear operation. Accordingly, the system solves the linear operation in an unencrypted space (at the second party), which is faster than solving in the encrypted space (at the first party), without revealing the original underlying data (because the unencrypted data is obfuscated by noise).

These, additional, and/or other aspects and/or advantages of embodiments of the invention are set forth in the detailed description which follows, possibly inferable from the detailed description, and/or learnable by practice of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
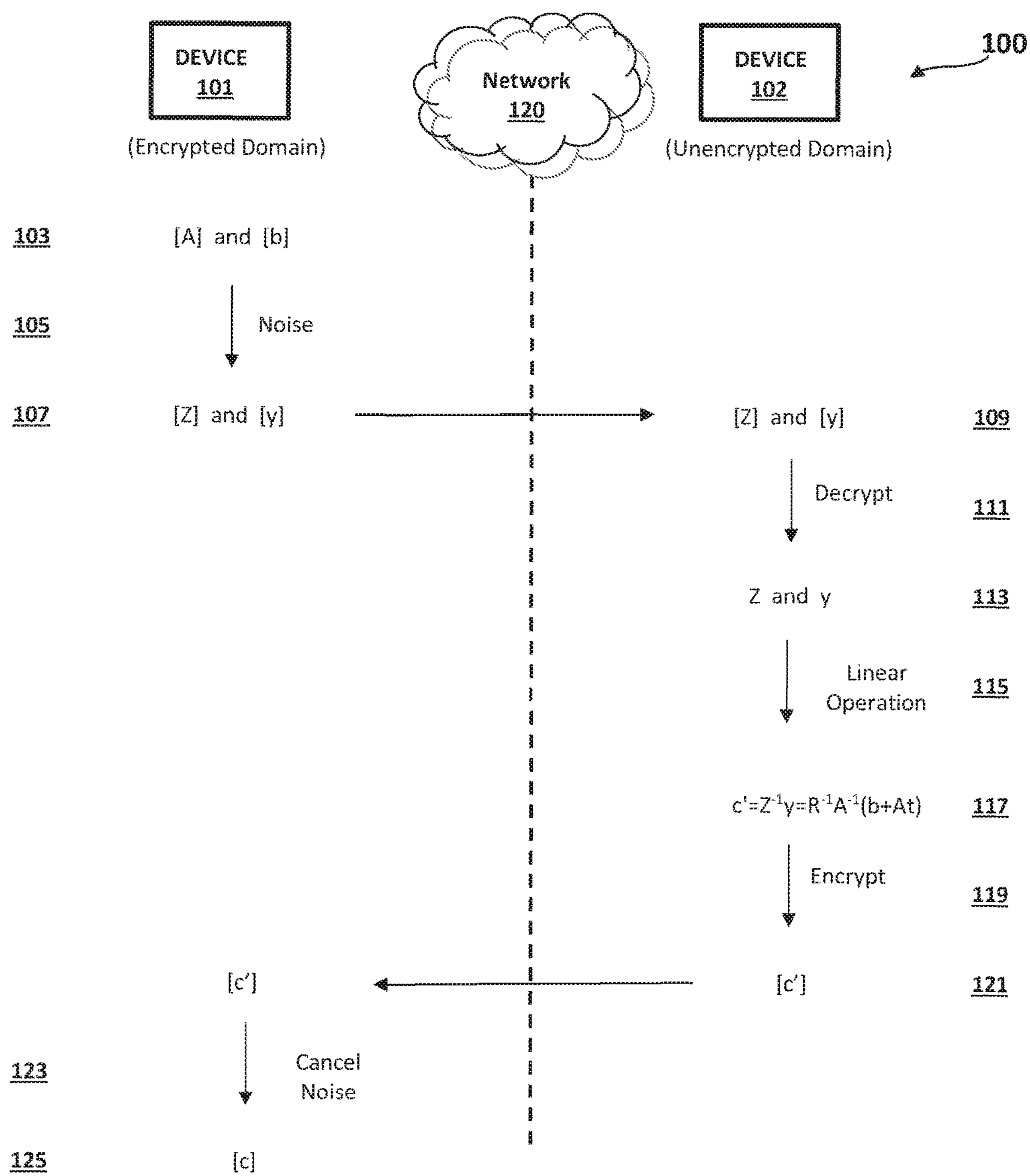
FIG. 1 is a schematic illustration of an interactive multiparty system for fast and secure solving of linear operations in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A major issue when performing homomorphic operations on encrypted information is speed. Homomorphic operations are broken down into additive homomorphism (Encryption (x)+Encryption (y)=Encryption (x+y)) and multiplicative homomorphisms (Encryption $(x)\cdot$Encryption $(y)$=Encryption $(x\cdot y)$). Such homomorphisms are extremely slow, especially for more complex operations. In particular, the size of the numbers in a ciphertext in all known embodiments of fully homomorphic encryption grows at least quadratically with the number of levels of multiplication in the computation, when the computation is expressed as an arithmetic circuit. In one example, inverting an N×N plaintext matrix can be done in two ways. In the first way, using the Gaussian elimination algorithm or its variants produces a deep circuit with N multiplicative levels. In the second way, using the definition of the determinant produces a comparatively shallow circuit with log N multiplicative levels, but size N! (N-factorial=$N\cdot(N-1)\cdot(N-2)\cdot \ldots \cdot 1$). Both methods result in prohibitively inefficient computations when executed in the encrypted domain using any known fully homomorphic encryption scheme. This phenomenon is pervasive in encrypted numerical linear algebra. As the number of homomorphic operations or data size increases, the number of homomorphic operations increase exponentially and quickly become unmanageable to solve in finite or efficient time.

Accordingly, embodiments of the invention provide a solution that solves linear operations using a linear number of corresponding homomorphic operations, significantly speeding up FHE cryptosystems. Embodiments of the invention provide this homomorphic speed-up by using a cryptosystem with two (or more) parties, e.g., party 1 and party 2, working collaboratively. Party 1 may operate in an encrypted domain (without access to the secret decryption key) and party 2 may operate in an unencrypted domain (with sole access to the secret decryption key). The goal is to solve a linear operation in the encrypted domain (e.g., find c, perhaps in the encrypted domain, such that [A]c=[b]), where brackets "[" and "]" denote that the interposed symbol(s) are encrypted) of an encrypted operator (e.g., [A]) on encrypted data (e.g., [b]), without exposing the unencrypted operator (e.g., A) or data (e.g., b) to either party 1 or 2, and at a speed faster than standard homomorphic operations in the encrypted domain. The first party 1 has access to the encrypted operator (e.g., [A]) and the encrypted data (e.g., [b]) but not the secret key to decrypt them. While the second party 2 is the sole device in possession of the secret key, it cannot access the encrypted operator (e.g., [A]) and encrypted data (e.g., [b]) and thus, cannot expose the underlying data (e.g., A and b). In order to speed up computation of the operation, party 1, which can only operate relatively slowly by homomorphic operations in the encrypted domain (because it does not possess the secret key), sends data to party 2 to decrypt using the secret key to compute operations relatively faster in the unencrypted domain. However, party 2 should not be able to access the encrypted data (e.g., [A] and [b]) because it could use the secret key to expose the underlying data (e.g., A and b). Instead, party 1 applies carefully chosen noise to the encrypted operator and data (e.g., [A] and [b]) to obfuscate the signals, and sends party 2 the noisy versions of the encrypted operator and data, so party 2 cannot uncover the real operator or data (e.g., A and b). For example, party 1 transforms the encrypted operator (e.g., [A]) to a noisy encrypted operator (e.g., [Z]=[AR]), where the noise (e.g., R) is random (non-zero) data, and transforms the encrypted data (e.g., [b]) to noisy encrypted data (e.g., [y]=[b+At]), where the noise (e.g., At or t) is random data. Party 1 send the noisy versions of the encrypted operator and data (e.g., [Z] and [y]) to party 2, which does not reveal anything about their noiseless counterparts (e.g., A and b). Party 2 uses its secret key to decrypt the noisy data (e.g., as Z and y) and solves the linear operation on the noisy data (e.g., Zc'=y, or equivalently, solving for $c'=Z^{-1}y=R^{-1}A^{-1}(b+At)$)). Party 2 encrypts the result (e.g., as [c']) and sends it back to party 1. Party 1, knowing the noise data values (e.g., R and t), applies inverse or noise-cancelling transformations, for example, homomorphically multiplying the received signal $[c'=Z^{-1}y=R^{-1}A^{-1}(b+At)]$ by the multiplied noise data (e.g., [R]) to get $[A^{-1}(b+At)]=[A^{-1}b+t]$ and homomorphically subtracting the added noise data (e.g., [t]) to solve the original linear operation (e.g., $[c]=[A^{-1}b]$) in the encrypted domain. This dual-party method is both faster than homomorphic computations by party 1 alone because the matrix inversion operation is executed in the faster unencrypted domain by the second party 2 that possesses the secret decryption key, and is just as secure because the underlying data (e.g., A and b) is never exposed to either the first party (e.g., accessing only the encrypted data e.g., [A] and [b]) or the second party (e.g., accessing only the noisy versions thereof, e.g., Z and y). Data, operators or linear operations of, A, b, c, Z, y, R, t, are examples only; any other data or linear operation thereof may be used and/or reduced to the forms above.

Reference is made to FIG. 1, which schematically illustrates an interactive multi-party system 100 for fast and secure solving of linear operations, according to an embodiment of the invention. System 100 is a multi-party system comprising a first party device 101 and a second party device 102 connected by a network 120 to transfer data therebetween. First party device 101 operates on encrypted data in an encrypted domain and does not possess the secret decryption key to decrypt that data. Second party device 102 possesses the secret decryption key for the encryption (e.g., the sole copy in system 100) to decrypt the encrypted data and operate in the unencrypted domain.

The goal is for the two parties' devices 101 and 102 to together run an interactive protocol to efficiently solve a linear operation (e.g., Ac=b), where only the first party device 101 can access the operation variable values (e.g., [A] and [b]) and only the second party device 102 can access the decryption key, such that neither party's device 101 or 102 has access to the original data or operator (e.g., A or b).

In operation 103, first party device 101 obtains or generates an encrypted linear operator (e.g., a n-by-n invertible matrix [A]) and encrypted data (e.g., vector [b]).

In operation 105, first party device 101 adds noise (e.g., a random square matrix [R] and a random vector [t]) to compute a noisy encrypted operator (e.g., [Z=AR]) and noisy encrypted data (e.g., [y=b+At]).

In operation 107, first party device 101 sends the noisy encrypted operator and data (e.g., [Z] and [y]) to second party device 102.

In operation 109, second party device 102 receives and stores the noisy encrypted operator and data (e.g., [Z] and [y]).

In operation 111, second party device 102 uses its secret key to decrypt the received data to generate noisy unencrypted operator and data (e.g., Z and y) 113. Even after decrypting, second party device 102 only has access to noisy versions of the operator and data (e.g., Z and y), which do not reveal any information about the original operator and data (e.g., A and b).

In operation 115, second party device 102 solves the linear operation, or equivalently performs a matrix inversion, (e.g., Ac=b) using the noisy unencrypted versions of the operator and data (e.g., Zc'=y) to generate an unencrypted solution to the noisy linear operation (e.g., $c'=Z^{-1}y=R^{-1}A^{-1}(b+At)$) 117.

In operation 119, second party device 102 encrypts the solution to the noisy linear operation (e.g., [c']).

In operation 121, second party device 102 sends the encrypted solution to the noisy linear operation (e.g., [c']) to first party device 101.

In operation 123, first party device 101 applies a noise-cancelling transformation (e.g., homomorphically multiplying the encrypted vector [c] by the multiplicative noise matrix [R], which cancels as $[c'R]=[Z^{-1}yR]=[R^{-1}RA^{-1}(b+At)]=[A^{-1}(b+At)]$, and homomorphically subtracting the additive noise vector [t], which cancels as $[A^{-1}(b+At)-t]=[A^{-1}b+t-t]=[A^{-1}b]$). Transformation 123 converts the encrypted solution to the noisy linear operation (e.g., $[c'=Z^{-1}y]$) to the encrypted solution to the original linear operation (e.g., $[c=A^{-1}b]$) 125.

Thus, to solve the linear operation Ac=b, the first party device 101 uses only a linear number of homomorphic operations (e.g., to add and cancel noise) and the second party device 102, which operates in unencrypted space, performs a matrix evaluation in the unencrypted space to solve a corresponding noisy linear operation. Thus, in total, the first and the second party devices 101 and 102 provide a total net speed-up as compared to the first party device 101 solving the linear operation entirely homomorphically (e.g., using at least a quadratic number of computational steps as is used to solve the linear operation non-homomorphically). In one example, entirely homomorphic operations would solve a linear operation with a 5×5 matrix operator in comparable time that embodiments of the invention solve a linear operation with a 100×100 matrix operator.

In some embodiments, all operations may occur in a finite field, or they may occur over the integers, or these operations may be translated to computations over fixed-precision real numbers (e.g., where fixed-precision real numbers refer to real numbers with a fixed number of decimal digits).

Figure 2:
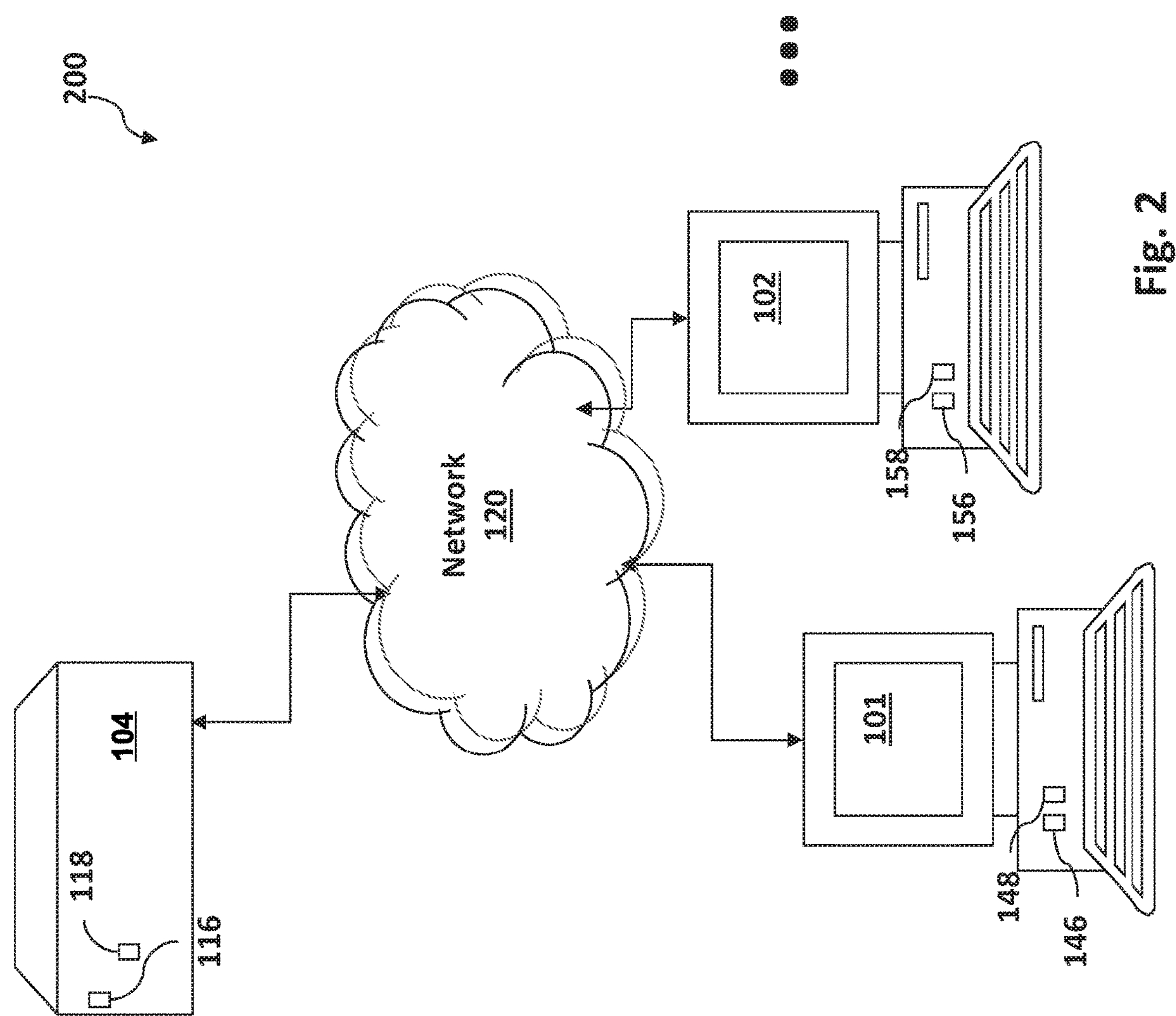
FIG. 2 is a schematic illustration of an interactive multiparty system for solving a linear operation in accordance with an embodiment of the invention.

Reference is made to FIG. 2, which schematically illustrates a multi-party system 200 for solving a linear operation according to an embodiment of the invention. System 200 may include one or more first party device(s) 101 and one or more second party device(s) 102 operated by respective distinct first and second users. In some embodiments, system 200 may include one or more host device(s) 104 for generating and managing keys, such as, a secret decryption key for an encryption that is sent only to second party device 102, and not first party device 101. Alternatively, second party device 102 may itself generate the secret decryption key for the encryption locally (e.g., so that the key is never transmitted to another device). In such embodiments, a separate host device 104 may or may not be used, or second party device 102 may act as the host device 104.

First and second party devices 101, 102, and/or host device(s) 104 may be connected via a network 120. Network 120 may be any public or private network such as the Internet. Access to network 120 may be through wire line, terrestrial wireless, satellite or other systems well known in the art.

First and second party devices 101, 102, and/or host device(s) 104 may be servers, personal computers, desktop computers, mobile computers, laptop computers, and notebook computers or any other suitable device such as a cellular telephone, personal digital assistant (PDA), video game console, etc., and may include wired or wireless connections or modems. First and second party devices 101, 102, and/or host device(s) 104 may include one or more controller(s) or processor(s) 146, 156, and 116, respectively, for executing operations according to embodiments of the invention and one or more memory unit(s) 148, 158, and 118, respectively, for storing data (e.g., encrypted data and an encrypted operator in first party device memory 148 or decryption keys in second party device memory 158) and/or instructions (e.g., software for applying operations according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 3:
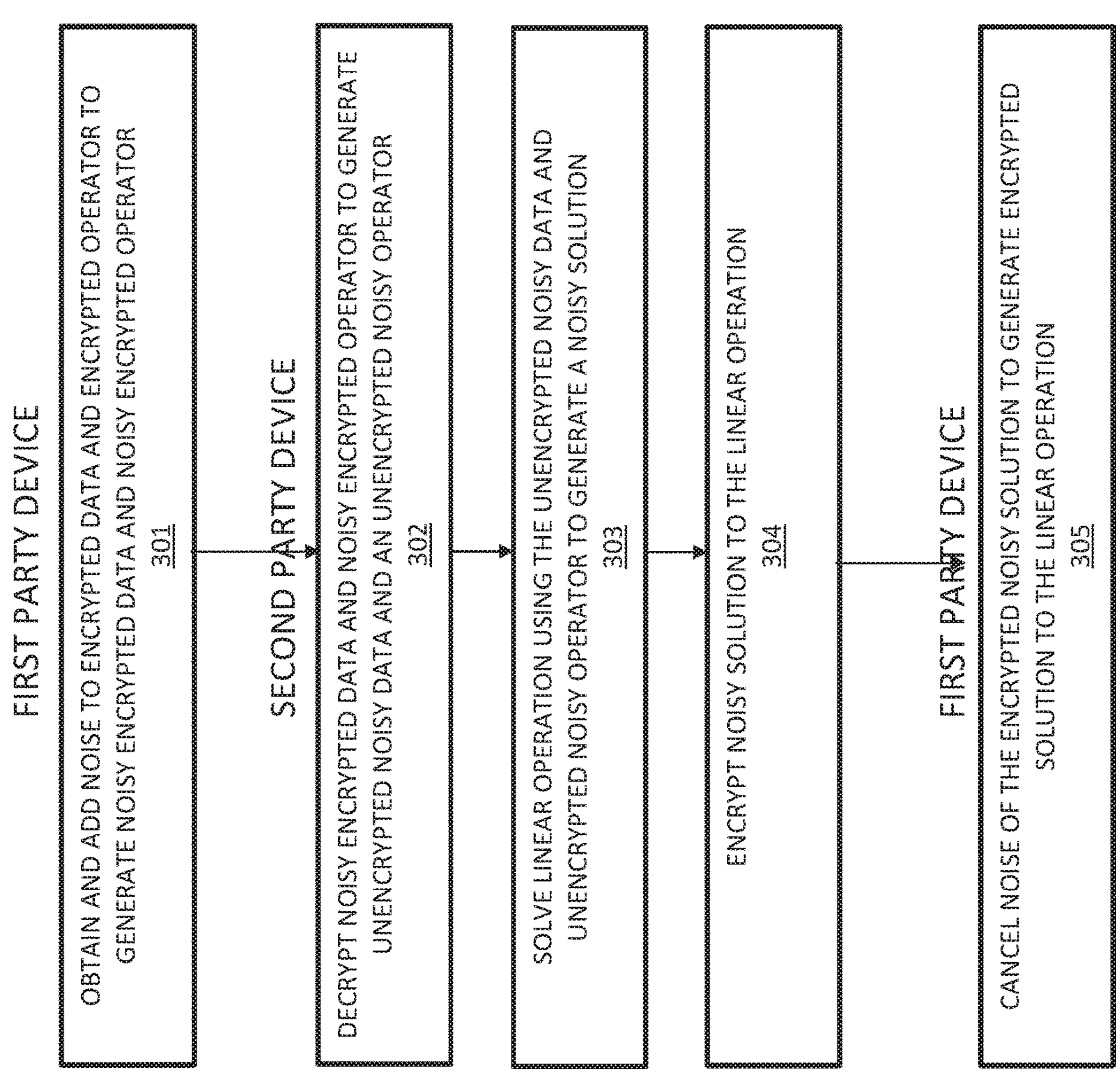
FIG. 3 is a flowchart of a method for solving a linear operation in an interactive multi-party system in accordance with an embodiment of the invention.

Reference is made to FIG. 3, which is a flowchart of a method for solving a linear operation using an interactive multi-party system in accordance with an embodiment of the invention. The method of FIG. 3 may be executed using, for example, the system of FIG. 2.

In operation 301, a processor (e.g., 146 of FIG. 2) in a first party device (e.g., 101 of FIG. 2) may obtain, store and add noise to encrypted data and an encrypted operator to generate noisy encrypted data and a noisy encrypted operator. The processor may transmit the noisy encrypted data and noisy encrypted operator to a second party device possessing a secret decryption key for the encryption.

In operation 302, a processor (e.g., 156 of FIG. 2) in a second party device (e.g., 102 of FIG. 2) may decrypt the noisy encrypted data and noisy encrypted operator to generate unencrypted noisy data and an unencrypted noisy operator.

In operation 303, a processor (e.g., 156 of FIG. 2) in a second party device (e.g., 102 of FIG. 2) may solve the linear operation using the unencrypted noisy data and an unencrypted noisy operator to generate a noisy solution.

In operation 304, a processor (e.g., 156 of FIG. 2) in a second party device (e.g., 102 of FIG. 2) may encrypt the noisy solution to the linear operation and transmit the encrypted noisy solution to the linear operation to the first party device.

In operation 305, a processor (e.g., 146 of FIG. 2) in a first party device (e.g., 101 of FIG. 2) may receive the encrypted noisy solution to the linear operation from the second party device, and cancel the noise of the encrypted noisy solution to generate the encrypted solution to the linear operation.

Other operations or orders of operations may be used.

Different parties may refer to physically distinct devices or systems operated by distinct persons or entities with different identities or security credentials.

It should be recognized that embodiments of the present invention may solve one or more of the objectives and/or challenges described in the background, and that embodiments of the invention need not meet every one of the above objectives and/or challenges to come within the scope of the present invention. While certain features of the invention have been particularly illustrated and described herein, many modifications, substitutions, changes, and equivalents may occur to those of ordinary skill in the art. It is, therefore, to be understood that the appended claims are intended to cover all such modifications and changes in form and details as fall within the true spirit of the invention.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for collaboratively performing homomorphic operations in an interactive multi-party system, the method comprising:

at a first party device in the multi-party system:

obtaining encrypted data and an encrypted operator for operating on the encrypted data according to a linear operation;

adding noise to the encrypted data and operator to generate noisy encrypted data and a noisy encrypted operator;

transmitting the noisy encrypted data and noisy encrypted operator to a second party device in the multi-party system that possesses a secret decryption key for the encryption;

receiving from the second party device an encrypted noisy solution to the linear operation generated by the second party device decrypting the noisy encrypted data and noisy encrypted operator to generate unencrypted noisy data and an unencrypted noisy operator and solving the linear operation using the unencrypted noisy data and an unencrypted noisy operator to generate a noisy solution; and cancelling the noise of the encrypted noisy solution to generate the encrypted solution to the linear operation.

2. The method of claim 1, wherein the first party device does not access to the secret decryption key.

3. The method of claim 1 comprising generating the noise by a random number generator.

4. A method for collaboratively performing homomorphic operations in an interactive multi-party system, the method comprising:

at a second party device in the multi-party system that possesses a secret decryption key for an encryption:

receiving noisy encrypted data and a noisy encrypted operator from a first party device in the multi-party system that are generated by adding noise to encrypted data and an encrypted operator, the encrypted operator operating on the encrypted data according to a linear operation;

decrypting the noisy encrypted data and noisy encrypted operator to generate unencrypted noisy data and an unencrypted noisy operator;

solving the linear operation using the unencrypted noisy data and an unencrypted noisy operator to generate a noisy solution;

encrypting the noisy solution to the linear operation; and transmitting the encrypted noisy solution to the linear operation to the first party device for the first party device to cancel the noise of the encrypted noisy solution to generate the encrypted solution to the linear operation.

5. The method of claim 4, wherein the second party does not give the first party device access to the secret decryption key.

6. A first party device in a multi-party system, the first party device comprising:

a memory to store encrypted data and an encrypted operator for operating on the encrypted data according to a linear operation; and a processor configured to:

add noise to the encrypted data and operator to generate noisy encrypted data and a noisy encrypted operator, transmit the noisy encrypted data and noisy encrypted operator to a second party device in the multi-party system that possesses a secret decryption key for the encryption, receive from the second party device an encrypted noisy solution to the linear operation generated by the second party device decrypting the noisy encrypted data and noisy encrypted operator to generate unencrypted noisy data and an unencrypted noisy operator and solving the linear operation using the unencrypted noisy data and an unencrypted noisy operator to generate a noisy solution, and cancel the noise of the encrypted noisy solution to generate the encrypted solution to the linear operation.

7. The first party device of claim 6, wherein the first party device does not have access to the secret decryption key.

8. The first party device of claim 6 comprising a random number generator for generating the noise.

9. A second party device in a multi-party system, the second party device comprising:

a memory to store a secret decryption key for an encryption; and a processor configured to:

receive noisy encrypted data and a noisy encrypted operator from a first party device in the multi-party system that are generated by adding noise to encrypted data and an encrypted operator, the encrypted operator operating on the encrypted data according to a linear operation, decrypt the noisy encrypted data and noisy encrypted operator to generate unencrypted noisy data and an unencrypted noisy operator, solve the linear operation using the unencrypted noisy data and an unencrypted noisy operator to generate a noisy solution, encrypt the noisy solution to the linear operation, and transmit the encrypted noisy solution to the linear operation to the first party device for the first party device to cancel the noise of the encrypted noisy solution to generate the encrypted solution to the linear operation.

10. The second party device of claim 9, wherein the second party does not give the first party device access to the secret decryption key.

11. A method for collaboratively performing homomorphic operations in an interactive multi-party system, the method comprising:

at a first party device in the multi-party system:

obtaining encrypted data and an encrypted operator for operating on the encrypted data according to a linear operation;

adding noise to the encrypted data and operator to generate noisy encrypted data and a noisy encrypted operator;

transmitting the noisy encrypted data and noisy encrypted operator to a second party device possessing a secret decryption key for the encryption;

at the second party device in the multi-party system:

decrypting the noisy encrypted data and noisy encrypted operator to generate unencrypted noisy data and an unencrypted noisy operator;

solving the linear operation using the unencrypted noisy data and an unencrypted noisy operator to generate a noisy solution;

encrypting the noisy solution to the linear operation;

transmitting the encrypted noisy solution to the linear operation to the first party device;

at the first party device:

receiving the encrypted noisy solution to the linear operation; and cancelling the noise of the encrypted noisy solution to generate the encrypted solution to the linear operation.

12. The method of claim 11, wherein the first party device does not have access to the secret decryption key.

13. The method of claim 11 comprising, at the first party device, generating the noise by a random number generator.

14. A multi-party system comprising a first and second party devices, wherein only the second party device, but not the first party device, has access to a secret decryption key, the system comprising:

a first party device configured to:

obtain encrypted data and an encrypted operator for operating on the encrypted data according to a linear operation, add noise to the encrypted data and operator to generate noisy encrypted data and a noisy encrypted operator, and transmit the noisy encrypted data and noisy encrypted operator to a second party device possessing a secret decryption key for the encryption; and a second party device configured to:

decrypt the noisy encrypted data and noisy encrypted operator to generate unencrypted noisy data and an unencrypted noisy operator, solve the linear operation using the unencrypted noisy data and an unencrypted noisy operator to generate a noisy solution, encrypt the noisy solution to the linear operation, and transmit the encrypted noisy solution to the linear operation to the first party device, wherein the first party device is further configured to:

receive the encrypted noisy solution to the linear operation, and cancel the noise of the encrypted noisy solution to generate the encrypted solution to the linear operation.

15. The multi-party system of claim 14, wherein the first party device does not have access to the secret decryption key.

16. The multi-party system of claim 14, wherein the first party device is further configured to generate the noise by a random number generator.

* * * * *